United States Patent
Driskell

(10) Patent No.: US 11,203,482 B2
(45) Date of Patent: Dec. 21, 2021

(54) PUMP DISPENSER WITH ACTUATING COLLAR

(71) Applicant: Silgan Dispensing Systems Corporation, Grandview, MO (US)

(72) Inventor: William L. Driskell, Lee's Summit, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 134 days.

(21) Appl. No.: 16/328,351

(22) PCT Filed: Sep. 7, 2017

(86) PCT No.: PCT/US2017/050423
§ 371 (c)(1),
(2) Date: Feb. 26, 2019

(87) PCT Pub. No.: WO2018/048998
PCT Pub. Date: Mar. 15, 2018

(65) Prior Publication Data
US 2020/0290793 A1    Sep. 17, 2020

Related U.S. Application Data

(60) Provisional application No. 62/384,835, filed on Sep. 8, 2016.

(51) Int. Cl.
*B65D 83/16* (2006.01)
*B65D 83/20* (2006.01)

(52) U.S. Cl.
CPC ................... *B65D 83/205* (2013.01)

(58) Field of Classification Search
CPC ............ B05B 11/3015; B05B 11/3052; B05B 11/00416; B05B 11/3074; B05B 11/0032; B05B 11/3023; B65D 83/205; B65D 83/16
USPC ....... 222/321.6, 321.8, 411, 522–525, 142.3, 222/173
See application file for complete search history.

(56) References Cited

U.S. PATENT DOCUMENTS

| | | | | |
|---|---|---|---|---|
| 3,726,437 A | * | 4/1973 | Siegel | B65D 83/262 222/648 |
| 4,238,055 A | * | 12/1980 | Staar | B05B 11/3052 222/162 |
| 4,260,082 A | | 4/1981 | Rooney et al. | |
| 6,533,482 B1 | * | 3/2003 | Byun | A45D 34/04 401/180 |
| 7,044,341 B2 | * | 5/2006 | Sanchez | B05B 11/0027 222/321.6 |
| 7,226,231 B2 | * | 6/2007 | Py | B65D 35/28 401/11 |

(Continued)

FOREIGN PATENT DOCUMENTS

FR    3021561 A1    12/2015

*Primary Examiner* — Charles P. Cheyney
(74) *Attorney, Agent, or Firm* — Barlow, Josephs & Holmes, Ltd.; Stephen J. Holmes

(57) ABSTRACT

A pump dispenser includes an actuator having at least one outward projection and a rotatable actuating collar at least partially surrounding the actuator and having at least one ramp rib defining a lower surface which engages the at least one outward projection such that rotation of the rotatable actuating collar acts on the actuator to dispense a product from or through the pump dispenser.

10 Claims, 6 Drawing Sheets

(56) References Cited

U.S. PATENT DOCUMENTS

| | | | |
|---|---|---|---|
| 9,365,408 B2* | 6/2016 | Tu | B05B 11/0056 |
| 9,609,935 B2* | 4/2017 | Lee | B65D 51/32 |
| 9,675,160 B2* | 6/2017 | Jung | A45D 34/00 |
| 9,681,731 B2* | 6/2017 | Jo | A45D 34/00 |
| 10,051,940 B2* | 8/2018 | Brugger | B01F 5/0666 |
| 10,345,133 B2* | 7/2019 | Ham | B05B 11/02 |
| 10,959,503 B2* | 3/2021 | Bilton | B05B 11/3052 |
| 2002/0145005 A1 | 10/2002 | Sanchez | |
| 2009/0127291 A1 | 5/2009 | Corbellini | |
| 2010/0111732 A1 | 5/2010 | Ciavarella et al. | |
| 2011/0315574 A1* | 12/2011 | Lee | B05B 11/0078 206/219 |
| 2013/0056494 A1* | 3/2013 | Pires | G01F 11/029 222/137 |
| 2013/0082071 A1* | 4/2013 | Ritzenhoff | B05B 11/3052 222/137 |
| 2015/0108173 A1* | 4/2015 | Kim | A45D 40/262 222/321.8 |
| 2016/0088921 A1* | 3/2016 | Jo | B05B 11/3052 222/173 |
| 2016/0242530 A1* | 8/2016 | Son | B05B 11/3052 |
| 2017/0157378 A1* | 6/2017 | Chang | A61K 47/32 |
| 2017/0181523 A1* | 6/2017 | Jung | B05B 11/3015 |
| 2018/0263359 A1* | 9/2018 | Kim | B65D 81/32 |

* cited by examiner

PUMP DISPENSER WITH ACTUATING COLLAR

BACKGROUND OF THE INVENTION

Field of the Invention

Embodiments of the invention relate generally to pump dispensers, and more particularly to pump dispensers having a rotational assembly or component for actuation of the dispenser.

State of the Art

Many pump dispensers are known in which a user actuates the dispenser to dispense an amount of product by pressing down on a spring-biased discharge head. One example of such a pump dispenser is disclosed in U.S. Pat. No. 7,870,977. For certain users and for certain applications, this type of actuation may be difficult or awkward. In addition, the dispensing action results in movement of the discharge orifice while the product is being dispensed which may be undesirable in certain applications. The actuation assembly and dispensing action may also be considered aesthetically unappealing by certain users. Thus it may be desirable to provide a pump dispenser with an alternative type of actuation.

BRIEF SUMMARY OF THE INVENTION

According to various embodiments of the invention, a pump dispenser may include a pump engine having an actuator associated therewith. An actuating collar in communication with the actuator may be configured to move in a rotational manner such that movement of the actuating collar acts on the actuator to operate the pump engine and dispense a product from the pump dispenser.

According to certain embodiments of the invention, an actuating collar may include one or more ramp ribs configured to engage an actuator or one or more projections off of an actuator. Rotational movement of the actuating collar may force movement of the actuator or one or more projections along a surface of the ramp ribs, thereby actuating the actuator and operating a pump or pump engine to pump a product through the pump dispenser.

According to some embodiments of the invention, the ramp ribs may be configured or shaped to allow movement of the actuating collar in both a clockwise and counter-clockwise direction. In other embodiments of the invention, the ramp ribs may be configured to include a stop and a sloping surface such that movement of the actuating collar may only occur in one direction.

The ramp ribs of the actuating collars according to various embodiments of the invention may include different shapes as desired. In addition, the movement of the actuator may be controlled or altered by switching out an actuating collar having ramp ribs with a first configuration with an actuating collar having ramp ribs in a second configuration. In this manner, the remaining parts of the pump dispenser may be held constant with only the actuating collar being changed to alter the amount of product dispensed from a pump dispenser. This allows for multiple configurations and outputs for pump dispensers according to embodiments of the invention without the need to change more than one part to achieve varying dispense volumes.

According to some other embodiments of the invention, a pump dispenser having an actuating collar according to certain embodiments may be combined with a refillable system such that refill bottles may be attached to the pump dispenser so that it may be used multiple times.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings, in which:

DETAILED DESCRIPTION OF THE INVENTION

Detailed descriptions of specific embodiments of pump dispensers are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the pump described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

According to various embodiments of the invention, a pump dispenser 10 may include a pump engine having an actuator 26 in communication with a rotatable actuating collar 36 such that rotation of the rotatable actuating collar 36 acts on the actuator 26 to dispense a product from—or move a product through—the pump dispenser 10.

Figure 1:
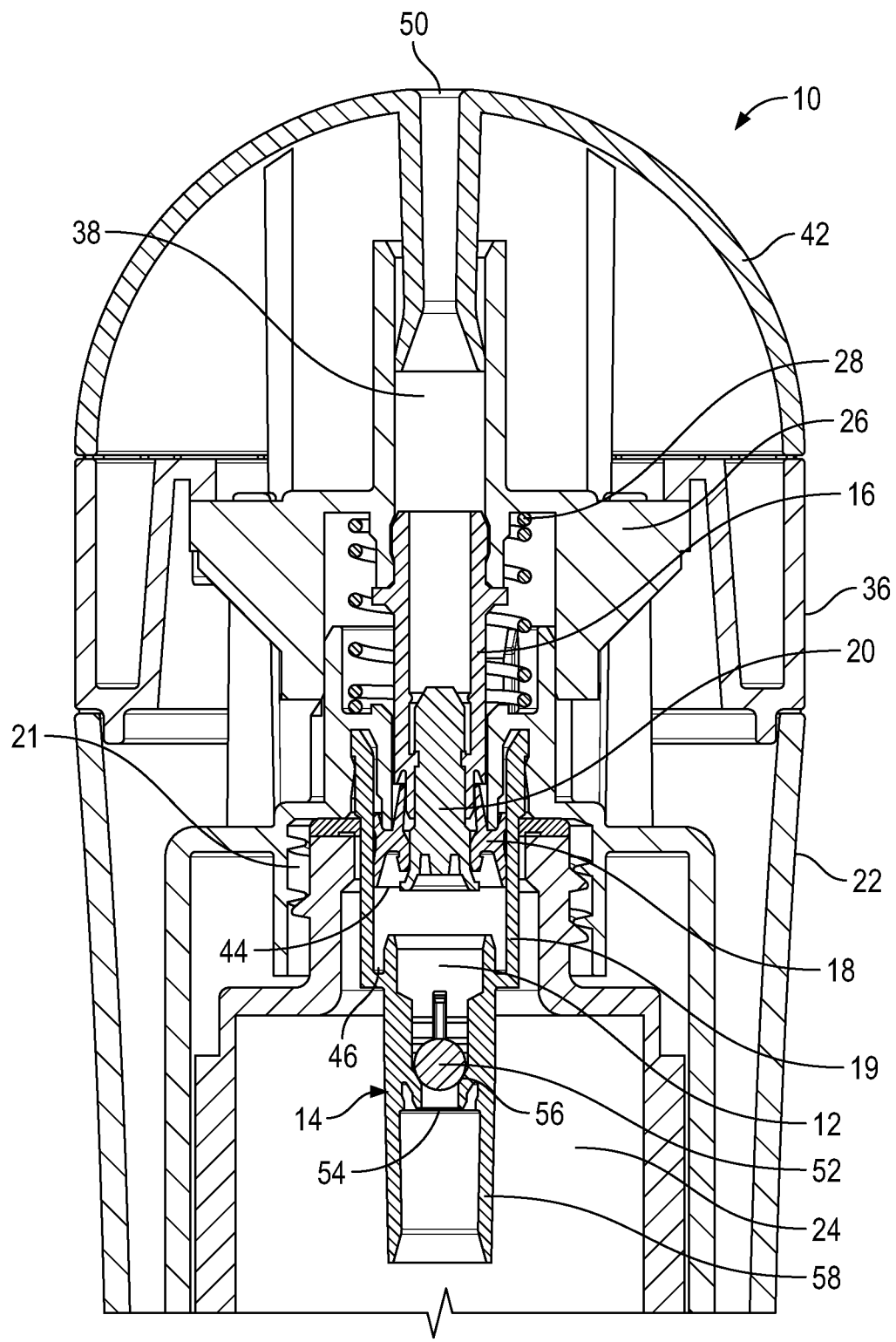
FIG. 1 is a partial cut-out view of a pump dispenser according to various embodiments of the present invention.
Figure 2:
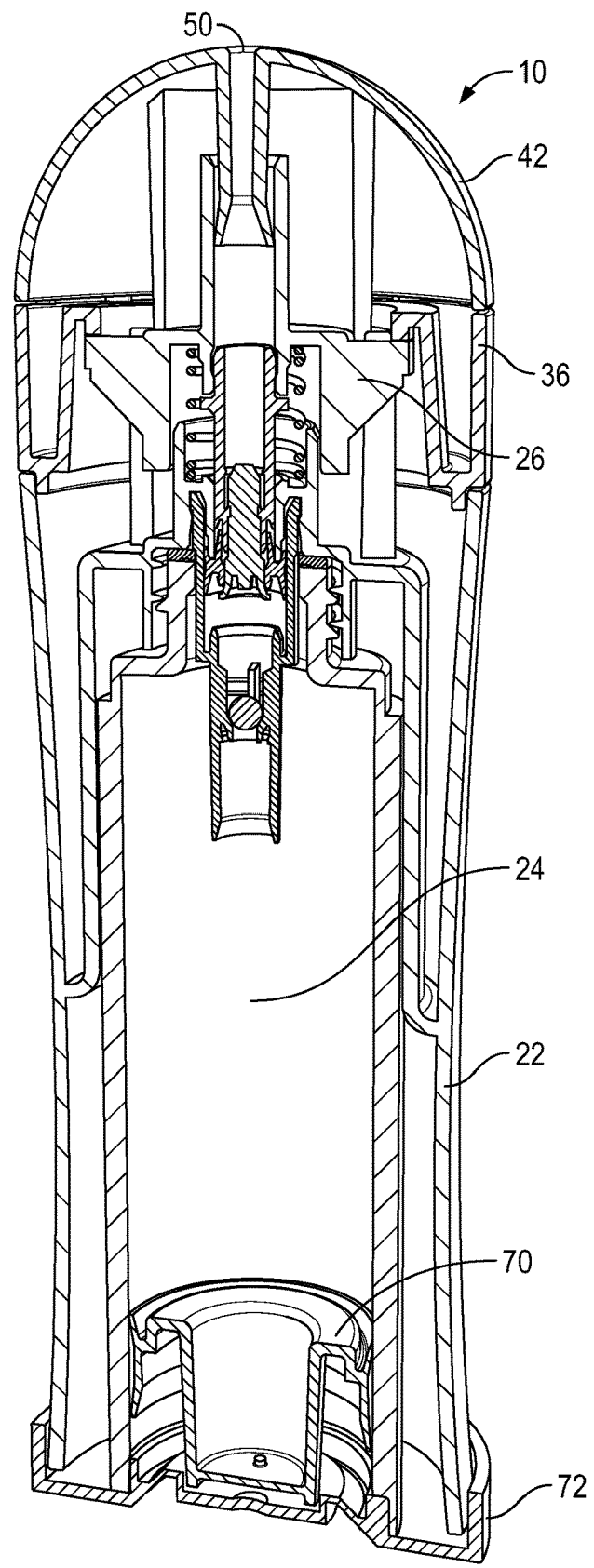
FIG. 2 is a cut-out view of a pump dispenser according to various embodiments of the invention.

As illustrated in FIG. 1, a pump dispenser 10 according to certain embodiments of the invention may include a conventional pump engine of the general type used in connection with the dispenser pumps described in, for example, U.S. Pat. No. 7,870,977, which is incorporated herein by reference in its entirety. As used herein, the term "pump engine" refers to those components of the pump dispenser 10 that may include an accumulator 19, valve assembly 14, piston rod 16, pump piston 18, and plug 20 or valve. A pump dispenser 10 generally includes an internal chamber 12 defined, in part, by the accumulator 19. Accumulator 19 may have a pump piston 16 reciprocally disposed therein. The accumulator 19, which is open at its upper end, may be supported by an outer pump housing 22. The outer pump housing 22 may also include an internally threaded cap 21. Internally threaded cap 21 may be adapted to support the accumulator 19 within the interior of a container 24 to dispense a liquid product from the container 24 as desired.

A spring-biased actuator 26 may be supported at the upper end of a piston rod 16. Actuator 26 may be biased to the extended, or rest, position illustrated in FIG. 1 under the bias of spring 28. Spring-biased actuator 26 may be fixedly mounted to hollow piston rod 16, which may be further fixedly mounted to plug 20 by a detent disposed in a groove of plug 20 or using another system. Plug 20 may include longitudinally extending ribs. During the actuation of a dispenser pump 10 according to certain embodiments of the invention, actuator 26 is moved downwards via rotation or actuation of collar 36 and the longitudinal channels between adjacently disposed ribs in plug 20 may permit passage of liquid product from the internal chamber 12 to discharge passage 38 and out through discharge orifice 50 of discharge head 42. Piston rod 16 may be slidably disposed relative to pump piston 18, which may be hollow and include plug 20 disposed therein as illustrated. Piston rod 16 may further include a gap between a respective surface thereof and an adjacent surface of pump piston 18. In this manner, piston rod 16 may slide by a predetermined length relative to pump piston 18 during reciprocation of actuator 26.

For example, according to some embodiments, when actuator 26 is first actuated downwards, piston rod 16 may slide downwards until surfaces of piston rod 16 and pump piston 18 engage during a piston pressure stroke. Further downwards movement of actuator 26 moves pump piston 18 downwards until the bottom surface 44 of pump piston 18 engages a surface 46 of accumulator 19, while the contents of internal chamber 12 are discharged through discharge orifice 50. On the ensuing return stroke, actuator 26 and piston rod 16 move upwards under the bias of spring 28. Initially, due to the frictional engagement between pump piston 18 and the inner wall of accumulator 19, surface 44 of pump piston 18 remains in contact with surface 46 of accumulator 19. This frictional engagement allows adjacent surfaces of piston rod 16 and pump piston 18 to re-separate and create the gap therebetween. Further upward movement of actuator 26 carries pump piston 18 upwards to re-fill internal chamber 12 with liquid product by virtue of the negative pressure created in internal chamber 12 and the operation of valve assembly 14.

According to some embodiments of the invention, accumulator 19 may include a valve assembly 14 having a one-way check valve 52 disposed therein for allowing liquid product from the container 24 to enter into chamber 12 via inlet port 54 during the piston rod 16 return stroke. As illustrated in FIG. 1, the check valve 52 may be a ball check valve and during the pressure stroke, check valve 52 may be disposed in contact with valve seat 56 to effectively seal chamber 12 and prevent liquid product disposed in chamber 12 from returning to the container 24. Accumulator 19 may also include a dip tube connection 58 to which a dip tube may be connected in certain embodiments.

Figure 3A:
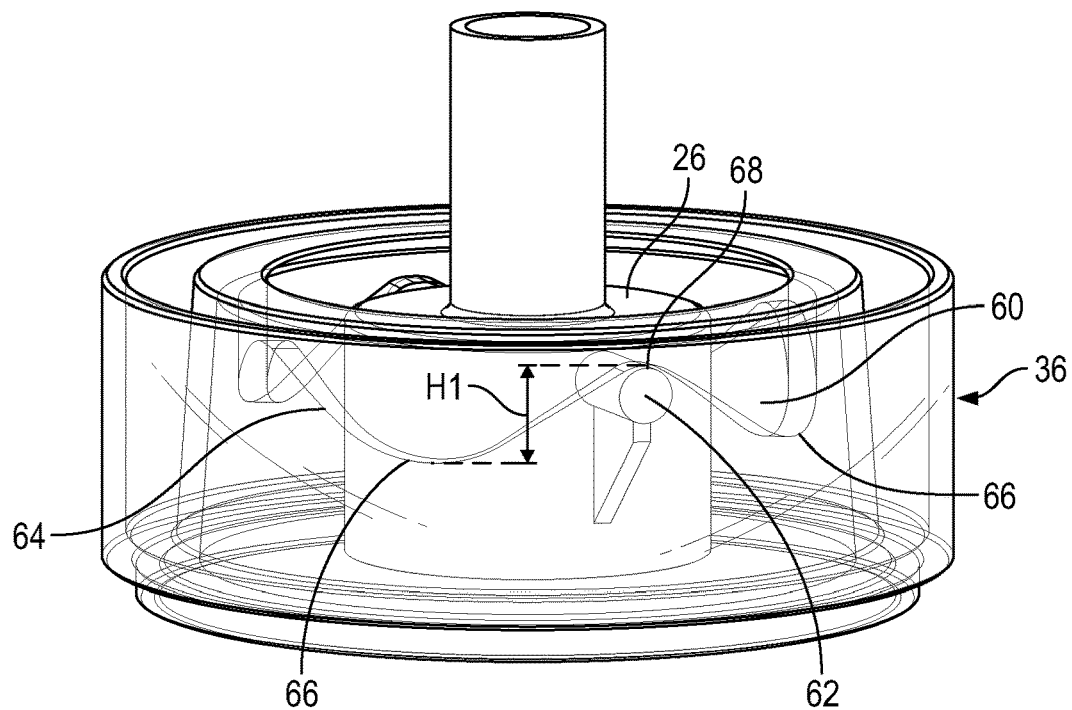
FIG. 3A is a see-through view of an actuating collar and actuator according to certain embodiments of the invention.

A pump dispenser 10 according to various embodiments of the invention may also include a rotatable actuating collar 36 that surrounds and engages actuator 26. Actuating collar 36 may be snap fit or may otherwise connect at its lower end to an upper portion of the pump dispenser's 10 outer pump housing 22 and, at its upper end, to a lower portion of dispenser head 42. Actuating collar 36 may be rotatable relative to the outer pump housing 22, the dispenser head 42, or both. Actuating collar 36 includes one or more internal annular ramp ribs 60 that engage one or more outward projections 62 of the actuator 26. An actuator 26 may include outward projections 62 disposed on sides of the actuator 26. In some embodiments two outward projections 62 may exist approximately 180 degrees apart from one another as illustrated in FIG. 3A. An upper portion of each outward projection 62 is urged into engagement with a lower surface 64 of the ramp rib 60 via the spring 28. The vertical height of the ramp rib's 60 lower surface 64 varies about the ramp rib's 60 circumference. As illustrated in FIG. 3A, the ramp rib's 60 lower surface 64 may define a generally sinusoidal or wavelike pattern including a plurality of peaks 66 and troughs or notches 68. The vertical distance between an adjacent peak 66 and trough 68 defines a wave height H1. Adjacent peaks 66 and adjacent troughs 68 are spaced apart by an angle of separation, which may be, for example, about 90 degrees.

When a pump dispenser 10 is not being actuated, spring 28 biases the outward projections 62 into two of the opposed ramp rib notches 68. In this position, the actuator 26 is in the position shown in FIG. 1. To actuate the pump dispenser 10 and dispense a metered dose of a liquid or gel product, a user rotates the actuating collar 36 relative to a remaining portion of the pump dispenser 10 in either a clockwise or counter-clockwise direction. The relative rotational movement between the actuator 26 and actuating collar 36 causes the outward projections 62 to slide down along the ramp rib's 60 lower surface 64 as they move from a starting notch 68 to an adjacent crest 66, thereby causing downwards movement of the actuator 26 and piston rod 16 and the dispensing of contents of chamber 12 through discharge orifice 50 as described above. Continued relative rotation causes the outward projections 62 to slide up the ramp from crest 66 to an adjacent notch 68, thereby permitting upwards movement of the actuator 26 and resulting in a piston return stroke. When the actuating collar 36 is released, spring 28 once again biases the outward projections 62 into an adjacent-most notch 68. As illustrated, the pump dispenser 10 may be configured so as to provide four pump cycles per complete revolution of the actuating collar 36. A pump dispenser 10 may also be configured for additional or fewer pump cycles based on the configuration of the outward projections 62 and ramp rib 60.

According to some embodiments of the invention, the stroke length of the pump dispenser 10 may be altered based on the configuration or shape of the ramp rib 60. For example, a pump dispenser 10 may include a chamber 12 having a one-ounce volume. In one embodiment, a pump dispenser 10 may include a ramp rib 60 configured to allow the entire volume of the chamber 12 to be evacuated with a single actuation. In other embodiments, an actuating collar 36 having a different ramp rib 60 configuration may be assembled to a pump dispenser 10 such that actuation only delivers half an ounce per actuation of the pump dispenser 10. In this way, multiple versions of a pump dispenser 10 may be offered or manufactured using common parts, the only change being the actuating collar 36.

Figure 3B:
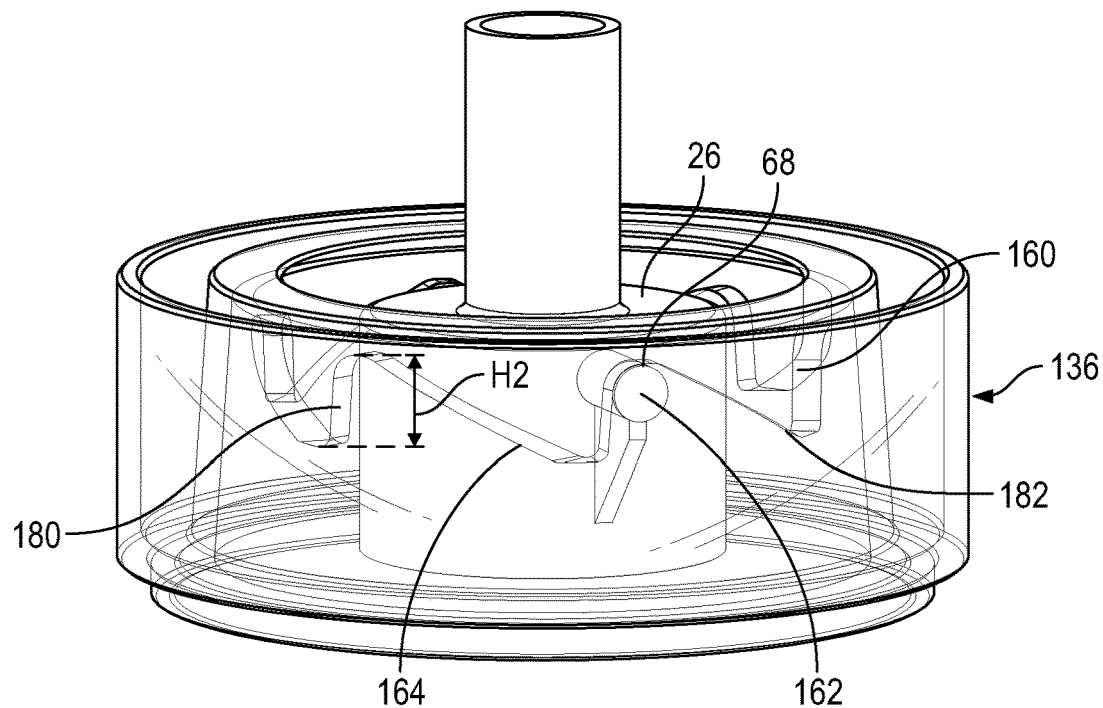
FIG. 3B is a see-through view of an actuating collar and actuator according to certain embodiments of the invention.

FIG. 3B illustrates an actuating collar 136 according to certain embodiments of the invention. The actuating collar 136 illustrated in FIG. 3B permits rotation of the collar 136 in only one direction (clockwise in the illustrated embodiment). The lower surface 164 of ramp rib 160 of actuating collar 136 includes alternating obliquely-angled ramp sections 182 and generally vertical stop sections 180 that together may form, for example, a sawtooth pattern. Ramp sections 182 and stop sections 180 have a vertical height H2. Adjacent ramp sections 182 and stop sections 180 define therebetween notches 168. Adjacent notches 168 (and adjacent stop sections 180) are spaced apart by an angle of separation, which may be, for example, about 60 degrees. When the pump dispenser 10 is not in use, spring 28 biases the outward projections 162 into two of the opposed notches 168. To actuate the pump dispenser 10 and dispense a metered dose of a liquid or gel product, a user rotates the actuating collar 136 in a clockwise direction relative to a remaining portion of the pump dispenser 10. The relative rotational movement between the actuator 126 and actuating collar 136 causes the outward projections 162 to slide down along a ramp section 182, thereby causing downwards movement of the actuator 26 and piston rod 16 and the dispensing of contents of chamber 12 through discharge orifice 50 in a manner similar to other embodiments of the invention. Continued relative rotation of the actuating collar 136 causes the outward projections 162 to clear the ramp section 182, permitting upwards movement of the actuator 26 as the outward projections 136 slide up along the adjacent stop section 180 and resulting in the piston return stroke. When the actuating collar 136 is released, spring 28 once again biases the outward projections 162 into an adjacent-most notch 168. As illustrated in FIG. 3B, a pump dispenser 10 may be configured to provide six pump cycles per complete revolution of the actuating collar 136. Other configurations of the actuating collar 136 may allow a greater or less number of pump cycles per complete revolution as desired.

While the embodiment illustrated in FIG. 3B allows rotation of the actuating collar 136 only in a clockwise rotation, other embodiments of the invention are not so limited. For instance, the ramp ribs 160 may be configured to allow counterclockwise rotation instead of clockwise rotation.

Similar to other embodiments of the invention, ramp ribs 160 of an actuating collar 136 may be configured to provide longer or shorter stroke lengths such that an actuating collar 136 may be selected to alter the amount of product dispensed by a pump dispenser 10 upon rotation of the actuating collar 136. For example, in some embodiments the configuration of the ramp ribs 160 may allow complete evacuation of the chamber 12. In other embodiments, the ramp ribs 160 may be configured to short stroke the pump dispenser 10 such that only a portion of chamber 12 is evacuated with each rotation of the actuating collar 136.

Figure 4A:
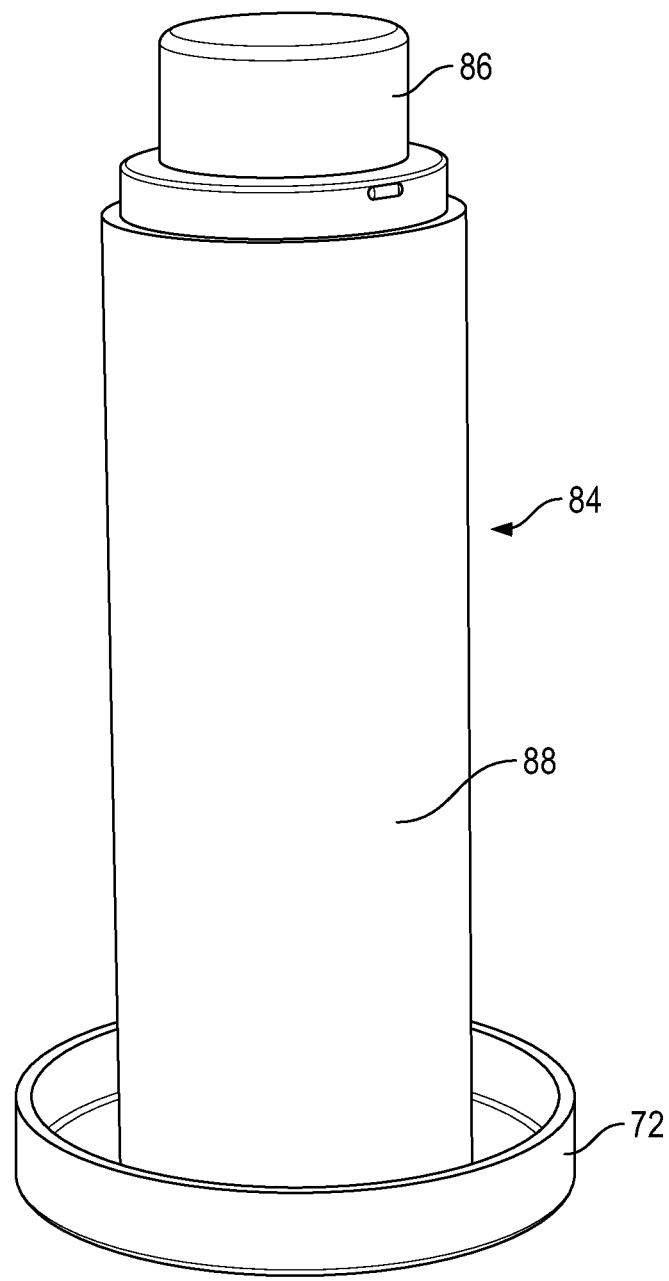
FIG. 4A is a perspective view of a cartridge refill that is compatible with a dispenser pump of various embodiments of the invention.
Figure 4B:
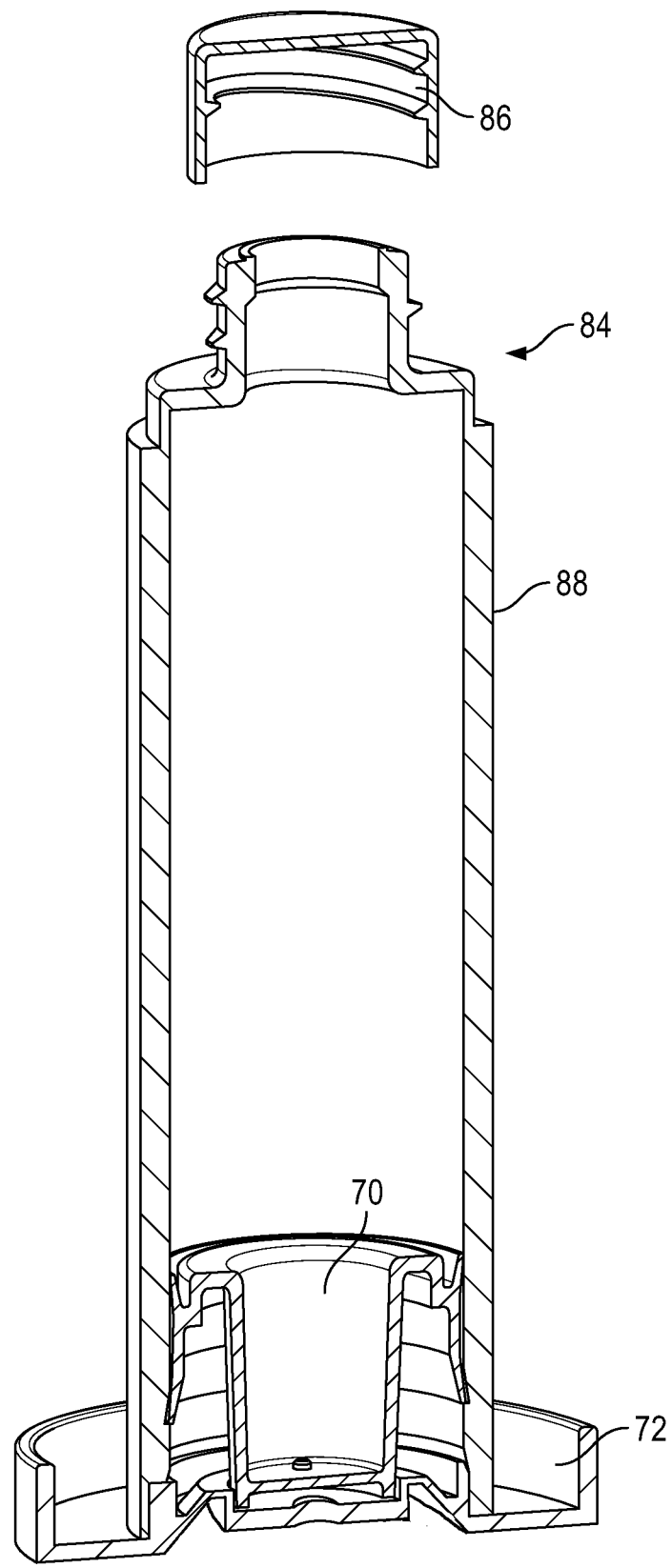
FIG. 4B is a cross-sectional view of the cartridge refill of FIG. 4A.
Figure 5:
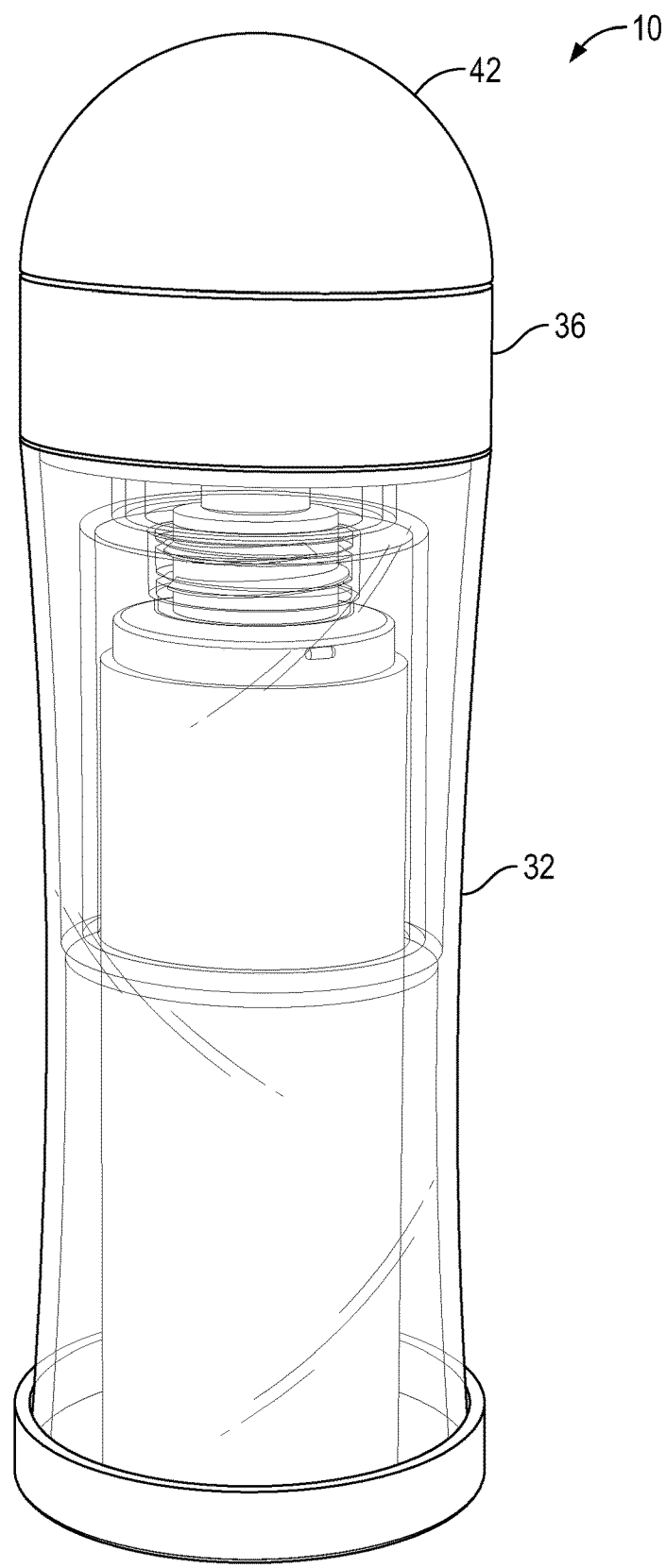
FIG. 5 is a perspective view of a fully-assembled dispenser pump according to certain embodiments of the invention.

FIG. 4A shows a perspective view of a refill cartridge 84 that can be used in combination with a pump dispenser 10 of various embodiments of the present invention. FIG. 4B shows an exploded cross-sectional view of refill cartridge 84. The refill cartridge 84 may include a cap 86, container bottle 88, follower piston 70, and base cover 72. The container 88 can be filled with product and then the threaded cap 86 can be applied and torqued to seal contents for shipping. A user can remove the cap 86 and install the cartridge 84 into the pump dispenser 10 by inserting the externally threaded neck of container 88 into the internally threaded cap 21 of outer pump housing 22 and twisting the cartridge 84 to tighten the connection, resulting in a fully-assembled pump dispenser 10 as shown in FIG. 5.

A pump dispenser 10 according to various embodiments of the invention allows for the use of a conventional pump engine. Multiple product volumes can be supported by changing a single part, namely the actuating collar. In particular, the vertical height H1 of the wave shape or, the vertical height H2 of ramp sections 182, can be adjusted to vary the amount of product dispensed. The length and shape of the wave shape or ramp sections can be adjusted to vary the amount of rotation required for a single pump cycle, as well as the amount of physical force required.

While various embodiments of the invention are described herein, it is understood that the particular embodiments defined by the appended claims are not to be limited by particular details set forth in the description, as many apparent variations thereof are contemplated. Rather, embodiments of the invention are limited only be the appended claims, which include within their scope all equivalent devices or methods which operate according to the principles of the embodiments of the invention described.

What is claimed is:

1. A pump dispenser, comprising:
   a container having a threaded neck;
   a pump partially received in the threaded neck;
   an outer pump housing threadably received on the container, the container and the pump are at least partially received within the outer pump housing;
   an actuator having at least one outward projection;
   a rotatable actuating collar at least partially surrounding the actuator, the rotatable actuating collar comprising an internal ramp rib defining a lower surface engaging at least one outward projection, the lower surface having a height that varies about a circumference of the internal ramp rib;
   a base cover covering a lower most face of the outer pump housing and a lower most face of the container;
   wherein the rotatable actuating collar is configured to be rotated by a user to produce relative rotational movement between the actuating collar and the actuator, wherein the relative rotational movement is configured to cause downward movement of the at least one outward projection and the actuator to thereby actuate dispensing of the pump; and
   wherein the rotatable actuating collar has an outer surface that is co-extensive with the outer pump housing.

2. The pump dispenser of claim 1, wherein the actuating collar is rotatable in either a clockwise or counterclockwise direction.

3. The pump dispenser of claim 2, wherein the lower surface of the internal ramp rib defines a generally wave-like pattern about the circumference.

4. The pump dispenser of claim 1, wherein the actuating collar is rotatable in a clockwise direction.

5. The pump dispenser of claim 1, wherein the actuating collar is rotatable in a counterclockwise direction.

6. The pump dispenser of claim 1 wherein the lower surface of the internal ramp rib comprises alternating obliquely-angled ramp sections and generally vertical stop sections.

7. The pump dispenser of claim 6, wherein the alternating obliquely-angled ramp sections and generally vertical stop sections define a sawtooth pattern.

8. The pump dispenser of claim 1, wherein the at last one outward projection comprises a pair of outward projections disposed on opposite sides of the actuator.

9. The pump dispenser of claim 1, further comprising a spring biasing the actuator into a first position in which the at least one outward projection is received within a notch defined by the lower surface.

10. The pump dispenser of claim 1, wherein the container is fully received within the outer pump housing.

* * * * *